(12) United States Patent
Kim

(10) Patent No.: US 11,565,954 B2
(45) Date of Patent: Jan. 31, 2023

(54) WATER TREATMENT DEVICE

(71) Applicant: Keun Soon Kim, Yongin-si (KR)

(72) Inventor: Keun Soon Kim, Yongin-si (KR)

( * ) Notice: Subject to any disclaimer, the term of this patent is extended or adjusted under 35 U.S.C. 154(b) by 783 days.

(21) Appl. No.: 16/335,683

(22) PCT Filed: Sep. 22, 2017

(86) PCT No.: PCT/KR2017/010443
§ 371 (c)(1),
(2) Date: Mar. 22, 2019

(87) PCT Pub. No.: WO2018/062774
PCT Pub. Date: Apr. 5, 2018

(65) Prior Publication Data
US 2021/0139353 A1 May 13, 2021

(30) Foreign Application Priority Data

Sep. 30, 2016 (KR) .................. 10-2016-0126019
Sep. 11, 2017 (KR) .................. 10-2017-0115700

(51) Int. Cl.
*C02F 1/48* (2006.01)
*C02F 1/00* (2006.01)
(Continued)

(52) U.S. Cl.
CPC .............. *C02F 1/487* (2013.01); *C02F 1/008* (2013.01); *C02F 1/482* (2013.01); *C02F 1/485* (2013.01);
(Continued)

(58) Field of Classification Search
CPC .. C02F 1/008; C02F 1/48; C02F 1/482; C02F 1/485; C02F 1/487; C02F 2101/12;
(Continued)

(56) References Cited

U.S. PATENT DOCUMENTS 5,584,994 A * 12/1996 Hattori .................. C02F 1/48
                                                                  210/195.1
2001/0019052 A1   9/2001 Sadahira et al.
2012/0211426 A1   8/2012 Santoro et al.

FOREIGN PATENT DOCUMENTS

JP        11-156346 A     6/1999
JP    2001178290 A *   7/2001
(Continued)

OTHER PUBLICATIONS

International Search Report for PCT/KR2017/010443 dated Jan. 12, 2018 from Korean Intellectual Property Office.

*Primary Examiner* — Magali P Slawski
*Assistant Examiner* — Brad Gordon
(74) *Attorney, Agent, or Firm* — Revolution IP, PLLC

(57) ABSTRACT

A device includes a tube body 110 being filled with water; an induction coil 120 installed at a center inside the tube body 110; and a plurality of heating plates 130, 140 arranged around the induction coil 120. The device further includes a high frequency generator 180 for applying high-frequency power to the induction coil 120 to heat the plurality of heating plates 130, 140, resulting in that the water in the tube body 110 is heated and converted into micro-cluster magnetized water; and a tube 150, positioned between a pair of magnets 160, 170 for causing the micro-cluster magnetized water to pass through an N-pole and an S-pole resulting from the pair of magnets 160, 170, thereby providing it as magnetized water exhibiting a high degree of electric conductivity.

4 Claims, 4 Drawing Sheets

(51) Int. Cl.
*G05D 7/06* (2006.01)
*H01F 5/00* (2006.01)
*C02F 101/12* (2006.01)

(52) U.S. Cl.
CPC ............ *G05D 7/0652* (2013.01); *H01F 5/00* (2013.01); *C02F 2101/12* (2013.01); *C02F 2201/005* (2013.01); *C02F 2201/483* (2013.01); *C02F 2209/02* (2013.01); *C02F 2209/05* (2013.01); *C02F 2209/06* (2013.01); *C02F 2209/29* (2013.01); *C02F 2209/40* (2013.01)

(58) Field of Classification Search
CPC .......... C02F 2201/005; C02F 2201/483; C02F 2209/02; C02F 2209/05; C02F 2209/06; C02F 2209/29; C02F 2209/40; C02F 1/005; C02F 1/02; G05D 7/0652; H01F 5/00; H05B 6/108
See application file for complete search history.

(56) References Cited

FOREIGN PATENT DOCUMENTS

| | | |
|---|---|---|
| KR | 20-0323820 Y1 | 8/2003 |
| KR | 10-2005-0025110 A | 3/2005 |
| KR | 20-0412136 Y1 | 3/2006 |
| KR | 20-2008-0004158 U | 9/2008 |
| KR | 10-1434193 B1 | 8/2014 |

* cited by examiner

[FIG. 1]
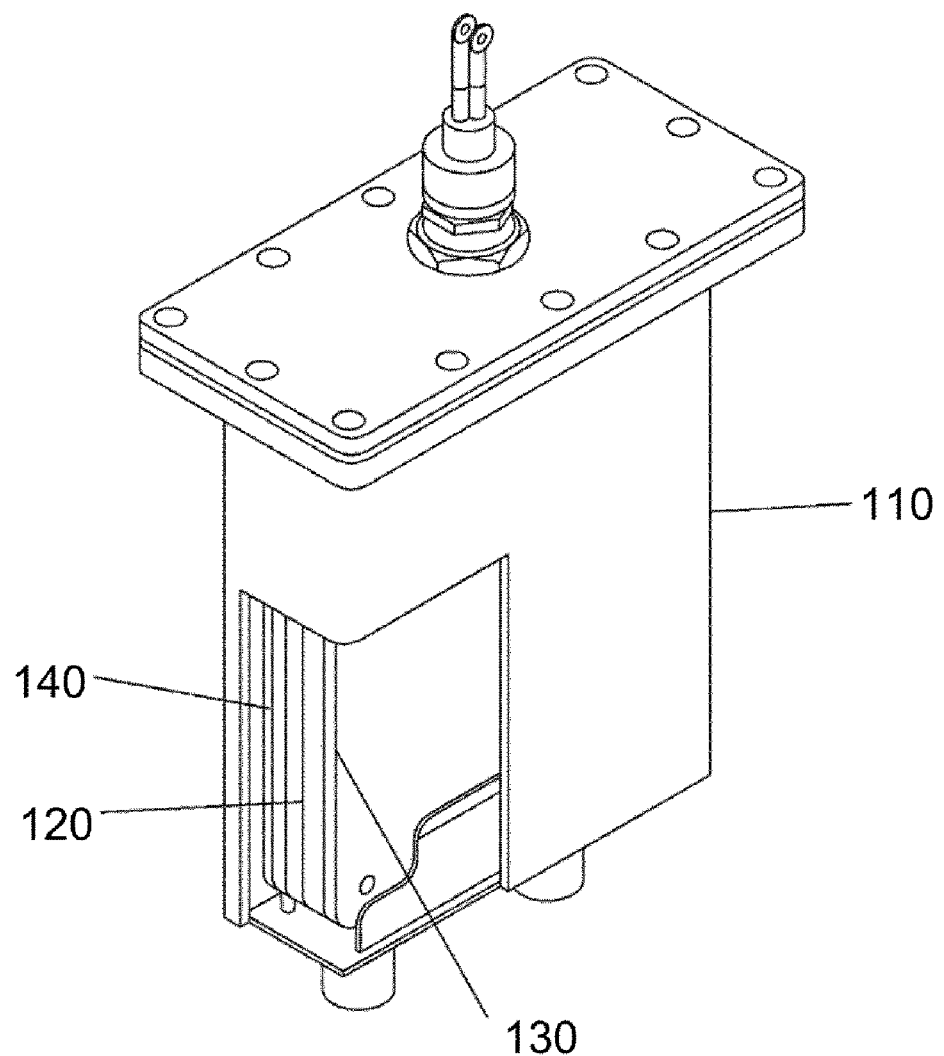

[FIG. 2]
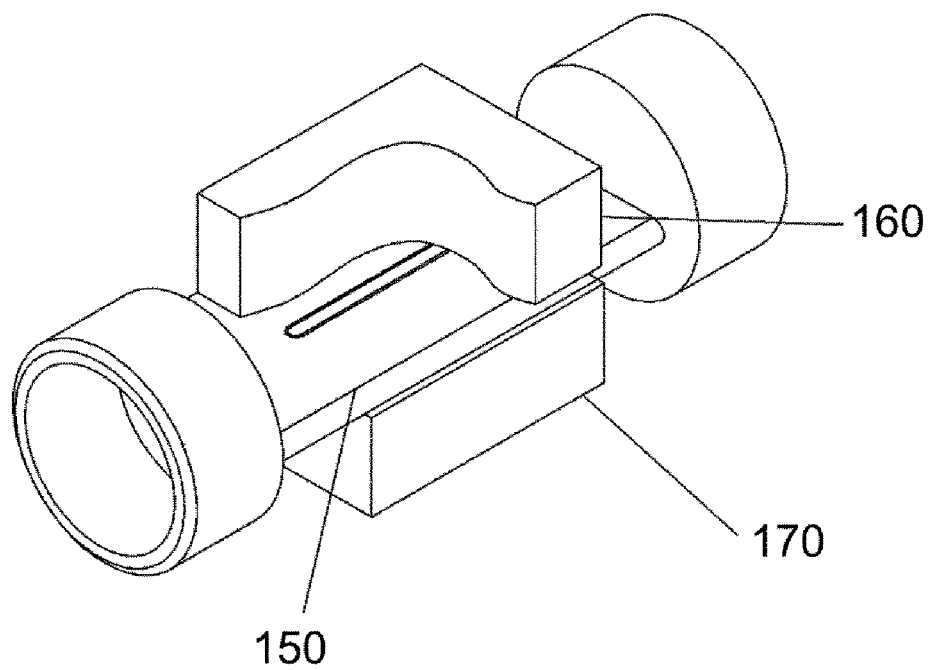

[FIG. 3]
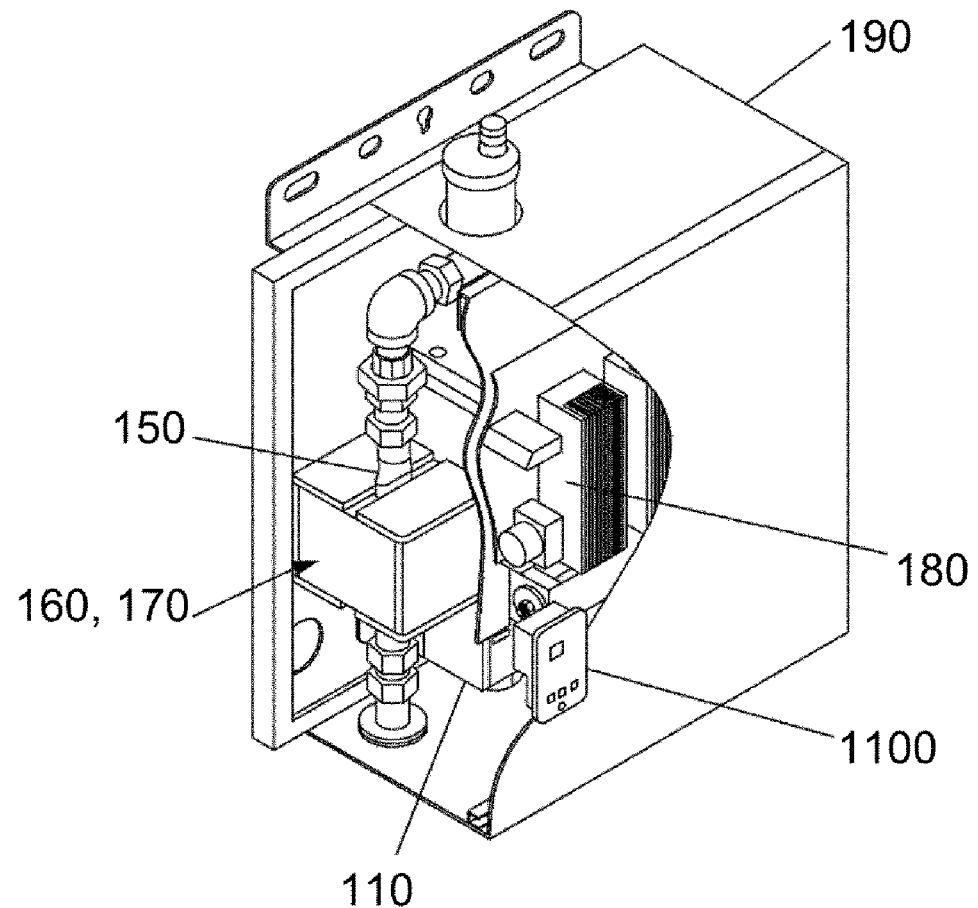

[FIG. 4]
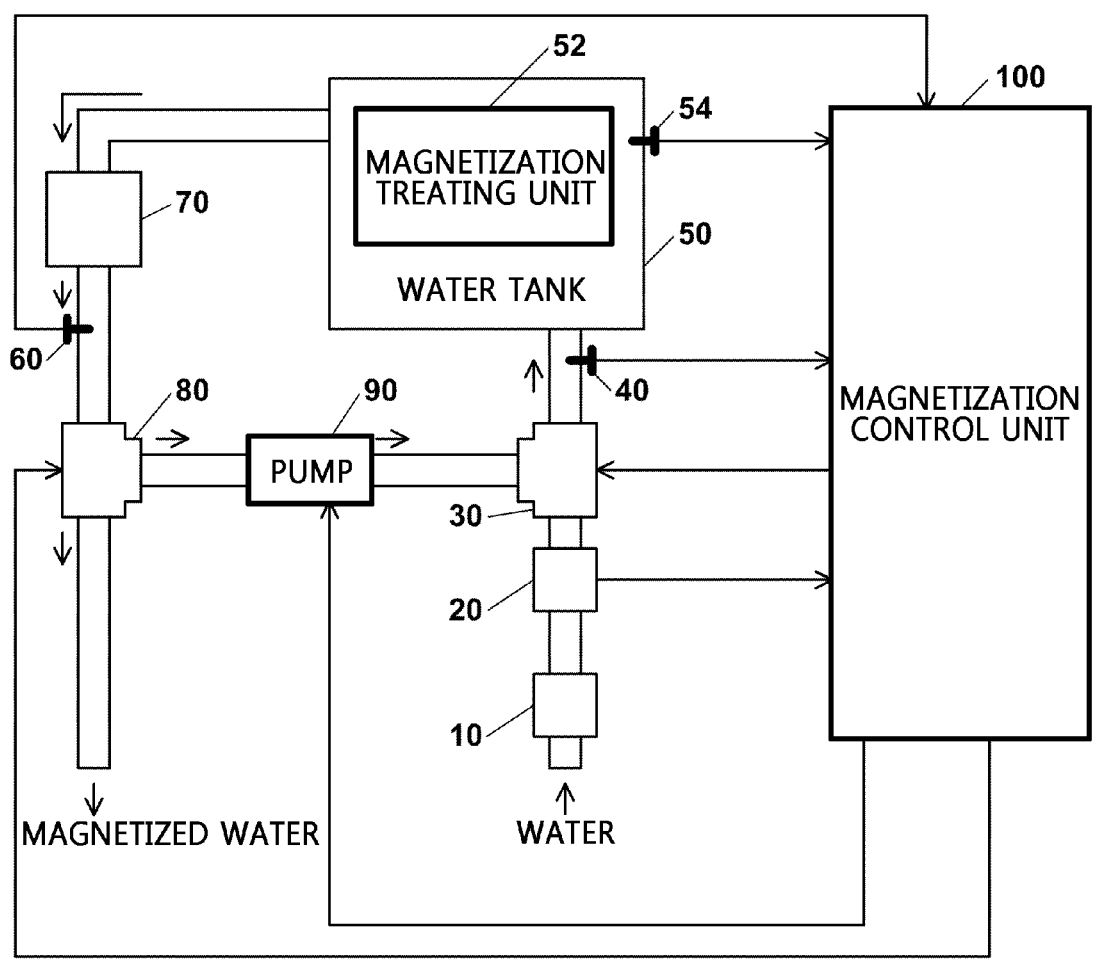

WATER TREATMENT DEVICE

TECHNICAL FIELD

The present invention relates to a magnetized water generating device.

BACKGROUND ART

Generally, it is common knowledge that the water exhibits magnetism or changes its electrical conductivity characteristics at a moment of passing through a magnetic field of the magnets, by allowing water to flow between or around installed magnets, after permanent magnets or electromagnets are installed at corresponding position, so that water is allowed to be generated as magnetized water.

However, the magnetization degree of the thus magnetized water is low.

Information on related prior art document: Registered Patent Publication No. 10-1434193 published on Aug. 28, 2014 titled "Super-high-efficiency induction hot water heater."

Further, in general, water, which is subjected to magnetization treatment, is magnetized to generate magnetized water.

However, in such magnetized water generating process, it is difficult to know magnetization ratio of water, which is subjected to magnetization treatment, so there is a limit in obtaining magnetized water with a high magnetization ratio.

Therefore, in the magnetized water generation process, it is necessary to generate magnetized water with a high magnetization ratio by performing magnetization treatment on water, which is subjected to magnetization treatment, one or more times according to pH hydrogen ion concentration index of a solution, conductivity or residual chlorine concentration.

Information on related prior art document: Utility Model Publication No. 20-2008-0004158 published on Sep. 25, 2008 titled "Faucet-directly-connectable hot and cold water dispenser-cum-water purifier with magnetized water device."

DISCLOSURE

Technical Problem

The present invention is conceived to address above-described problems, and the object of the present invention is to provide a magnetized water generating device in which, by arranging the plurality of heating plates, which are induction conductors, around the induction coil at a predetermined interval from the induction coil installed at the center inside the tube body, whose interior is filled with water, and applying high-frequency power to the induction coil causing the induction coil to induce this high-frequency power to the plurality of heating plates, the plurality of heating plates are heated, so that the water filling the interior of the tube body is heated and converted into micro-cluster magnetized water, and then the micro-cluster magnetized water is caused to pass through the tube, whose middle portion is plurally divided, between an N-pole and an S-pole resulting from the pair of magnets.

Further, the present invention is conceived to address above-described problems, and another object of the present invention is to provide a magnetized water generating device which, in a generation process of magnetized water, causes water, which is subjected to magnetization treatment, to be subjected to magnetization treatment one or more times according to pH, conductivity or residual chlorine concentration.

Technical Solution

In order to achieve such objects, in accordance with one aspect of the present invention, there is provided a magnetized water generating device, which includes:

a tube body 110 whose interior is filled with water;

an induction coil 120 installed at a center inside the tube body 110;

a plurality of heating plates 130, 140 arranged as induction conductors around the induction coil 120 at a predetermined interval from the induction coil 120;

a high frequency generator 180 for applying high-frequency power to the induction coil 120, such that the induction coil 120 induces the high-frequency power to the plurality of heating plates 130, 140 and, as the plurality of heating plates 130, 140 are heated, the water filling the interior of the tube body 110 is heated and converted into micro-cluster magnetized water; and a tube 150, positioned between a pair of magnets 160, 170, for receiving the micro-cluster magnetized water, dividing the same into a plurality of streams, and causing the plurality of streams to pass through an N-pole and an S-pole resulting from the pair of magnets 160, 170, wherein the plurality of streams is collected to be provided as magnetized water exhibiting a high degree of electric conductivity for a next stage.

It is characterized by that the tube 150 is a polyethylene injection tube or a polyvinyl chloride injection tube.

It is characterized by that the pair of magnets 160, 170 are formed with permanent magnets or electromagnets.

It is characterized by that the high-frequency power is formed by frequency multiplying by several hundred times a frequency of 50 Hz up to 60 Hz single or three-phase power having a voltage ranging from 110V to 380V.

In accordance with another aspect of the present invention, there is provided a magnetized water generating device, which includes:

a first three-way valve 30 which provides water supplied through a tube from outside or magnetized water supplied through a tube from a pump 90, to the water tank 50 through a tube;

a magnetization treating unit 52 which is installed inside the water tank 50 to magnetize and send water in the water tank 50 out through a tube;

a second three-way valve 80 which sends out through a tube or supplies to the pump 90 through a tube the magnetized water sent out by the magnetization treating unit 52 as a magnetized water;

a pump 90 which supplies to the first three-way valve 30 magnetized water supplied from the second three-way valve 80;

a first magnetization degree sensor 40 which senses magnetization degree of water inside a tube between the first three-way valve 30 and the water tank 50 based on pH of water, conductivity of water or residual chlorine concentration of water;

a second magnetization degree sensor 60 which senses magnetization degree inside a tube between the magnetization treating unit 52 and the second three-way valve 80 based on pH of water, conductivity of water or residual chlorine concentration of water; and a magnetization control unit 100 which, in a case where the magnetization degrees of water supplied from the first and second magnetization degree sensors 40, 60 correspond to a stabilized magnetized water, controls the second three-way valve 80 to cause the second three-way valve 80 to send out the magnetization treated water sent out by the magnetization treating unit 52 as a magnetized water; which, in a case where the magnetization degrees of water supplied from the first and second magnetization sensors 40, 60 do not correspond to the stabilized magnetization water, controls the second three-way valve 80 to cause the second three-way valve 80 to supply to the pump 90 the magnetization treated water sent out by the magnetization treating unit 52, controls the pump 90 to cause the pump 90 to supply to the first three-way valve 30 the magnetized water supplied from the second three-way valve 80, and controls the first three-way valve 30 to cause the first three-way valve 30 to supply to the water tank 50 the magnetization treated water supplied from the pump 90; and which, in a case where temperature of water inside the water tank 50 is equal to or greater than a predetermined threshold when receiving temperature information of water inside the water tank 50 from the temperature sensor 54 installed at the water tank 50, determines a magnetization unstable state and controls the second three-way valve 80 to cause the second three-way valve 80 to send out the magnetization treated water sent out by the magnetization treating unit 52 as a magnetized water.

It is characterized in that water supplied through a tube from the outside is supplied through a check valve 10.

It is characterized by further comprising a fluid flow sensor 20 which is installed at a tube between the check valve 10 and the first three-way valve 30 to sense fluid flow of the tube and provide a fluid flow sensing signal to the magnetization control unit 100, causing the magnetization control unit 100 to perceive the supply of water and operate.

It is characterized by further comprising a supplementary magnetization treating unit 70 which is installed at a tube between the magnetization treating unit 52 and the second magnetization degree sensor 60 to further perform magnetization treatment of the magnetized water sent out by the magnetization treating unit 52.

Advantageous Effects

According to the present invention, by arranging the plurality of heating plates 130, 140, which are induction conductors, around the induction coil 120 at a predetermined interval from the induction coil 120 installed at the center inside the tube body 110, whose interior is filled with water, and applying high-frequency power to the induction coil 120 causing the induction coil 120 to induce this high-frequency power to the plurality of heating plates 130, 140, the plurality of heating plates 130, 140 are heated, so that the water filling the interior of the tube body 110 is heated and converted into micro-cluster magnetized water, and then the micro-cluster magnetized water is caused to pass through the tube 150, whose middle portion is plurally divided, between the N-pole and the S-pole resulting from the pair of magnets 160, 170, whereby there is an effect that magnetized water exhibiting high electrical conductivity can be generated from general water.

Further, the present invention has an effect that, in the generation process of magnetized water, there is an advantage that magnetized water with a high magnetization ratio can be generated by causing water, which is subjected to magnetization treatment, to be subjected to magnetization treatment one or more times according to pH, conductivity or residual chlorine concentration.

DESCRIPTION OF DRAWINGS

FIG. 1 is a diagram showing an embodiment of a tube body constituting a magnetized water generating device according to the present invention.

FIG. 2 is a diagram showing an embodiment of a tube whose middle portion is divided plurally and a pair of magnets constituting the magnetized water generating device according to the present invention.

FIG. 3 is a diagram showing an embodiment of the magnetized water generating device according to the present invention shown by combining FIGS. 1 and 2.

FIG. 4 is a diagram showing another embodiment of a magnetized water generating device according to the present invention.

BEST MODE

Hereinafter, embodiments of the present invention will be described in detail with reference to accompanying drawings.

FIG. 1 is a diagram showing an embodiment of a tube body 110 constituting a magnetized water generating device according to the present invention, wherein an induction coil 120 and a plurality of heating plates 130 and 140 are configured inside the tube body 110.

FIG. 2 is a diagram showing an embodiment of a tube 150 and a pair of magnets 160, 170 constituting the magnetized water generating device according to the present invention.

FIG. 3 is a diagram showing an embodiment of the magnetized water generating device according to the present invention shown by combining FIGS. 1 and 2. The magnetized water generating device includes the tube body 110, the tube 150, the pair of magnets 160, 170 and a high frequency generator 180, all of which are configured inside an outer casing 190. In this configuration, an on-off switch 1100 is installed on an outer surface of the exterior casing 190 to perform an on-off control of drive of the high frequency generator 180.

FIG. 4 is a diagram showing another embodiment of a magnetized water generating device according to the present invention. The magnetized water generating device is comprised of a check valve 10, a fluid flow sensor 20, first and second three-way valves 30, 80, first and second magnetization degree sensors 40, 60, a water tank 50, a magnetization treating unit 52, a temperature sensor 54, a supplementary magnetization treating unit 70, a pump 90 and a magnetization control unit 100.

In FIGS. 1 to 3, an inside of the tube body 110 is filled with water. That is, the water filling the interior of the tube body 110 is heated by a plurality of heating plates 130, 140, and supplied to an outside through the tube 150. Here, it is preferred that the tube 150 is a polyethylene injection tube or a polyvinyl chloride injection tube.

The induction coil 120 is installed at the center inside the tube body 110.

The plurality of heating plates 130, 140, which are induction conductor, are arranged around the induction coil 120 at a predetermined interval from the induction coil 120.

The high frequency generator 180 applies high-frequency power to the induction coil 120 such that the induction coil 120 induces high-frequency power to the plurality of heating plates 130, 140. Consequently, the plurality of heating plates 130, 140 are heated, which results in that the water filling the interior of the tube body 110 is heated and converted into micro-cluster magnetized water. In this regard, it is preferred that the high-frequency power is formed by frequency multiplying by several hundred times a frequency of 50 Hz up to 60 Hz single or three-phase power having a voltage ranging from 110V to 380V.

The tube 150 serves to receive the micro-cluster magnetized water and divide it into a plurality of parts, allowing them to passing between an N pole and an S pole by the pair of magnets 160, 170, and then collect them to supply as magnetized water with high electrical conductivity for a next stage.

That is, the tube 150 is positioned between the pair of magnets 160, 170 and it is preferred that the pair of magnets 160, 170 are formed with permanent magnets or electromagnets.

Further, in FIG. 4, the first three-way valve 30 provides water supplied through a tube from outside or the magnetized water supplied through a tube from pump 90, to the water tank 50 through a tube. In this case, the water supplied through the tube from the outside is supplied through the check valve 10 which allows a fluid to flow only in one direction.

The magnetization treating unit 52 is installed inside the water tank 50 to magnetize and send water in the water tank 50 out through a tube.

The second three-way valve 80 sends out through a tube or supplies to the pump 90 through the tube the magnetized water sent out by the magnetization treating unit 52 as a magnetized water.

The pump 90 supplies to the first three-way valve 30 the magnetized water supplied from the second three-way valve 80.

The first magnetization degree sensor 40 senses magnetization degree of water inside a tube between the first three-way valve 30 and the water tank 50 based on pH of water, conductivity of water or residual chlorine concentration of water.

The second magnetization degree sensor 60 senses magnetization degree inside a tube between the magnetization treating unit 52 and the second three-way valve 80 based on pH of water, conductivity of water or residual chlorine concentration of water.

In a case where the magnetization degrees of water supplied from the first and second magnetization degree sensors 40, 60 correspond to a stabilized magnetized water, the magnetization control unit 100 controls the second three-way valve 80 to cause the second three-way valve 80 to send out the magnetization treated water sent out by the magnetization treating unit 52 as a magnetized water. In a case where the magnetization degrees of water supplied from the first and second magnetization sensors 40, 60 do not correspond to the stabilized magnetization water, the control unit controls the second three-way valve 80 to cause the second three-way valve 80 to supply to the pump 90 the magnetization treated water sent out by the magnetization treating unit 52, controls the pump 90 to cause the pump 90 to supply to the first three-way valve 30 the magnetized water supplied from the second three-way valve 80, and controls the first three-way valve 30 to cause the first three-way valve 30 to supply to the water tank 50 the magnetization treated water supplied from the pump 90; Further, in a case where temperature of water inside the water tank 50 is equal to or greater than a predetermined threshold when receiving temperature information of water inside the water tank 50 from the temperature sensor 54 installed at the water tank 50, the control unit determines a magnetization unstable state, thereby controlling the second three-way valve 80 to cause the second three-way valve 80 to send out the magnetization treated water sent out by the magnetization treating unit 52 as a magnetized water.

The fluid flow sensor 20 is installed at a tube between the check valve 10 and the first three-way valve 30 to sense fluid flow of the tube and provide a fluid flow sensing signal to the magnetization control unit 100, causing the magnetization control unit 100 to perceive the supply of water and operate.

The supplementary magnetization treating unit 70 is installed at a tube between the magnetization treating unit 52 and the second magnetization degree sensor 60 to further perform magnetization treatment of the magnetized water sent out by the magnetization treating unit 52.

Meanwhile, since pH and conductivity increase and residual chlorine concentration becomes weakened as water is magnetized, the magnetization degree of water can be determined by the pH, conductivity and residual chlorine concentration of water. In this regard, since the water is not magnetized well when its temperature is equal to or greater than a specific temperature (for example about 80° C.), the unstable state of the magnetized water may be determined when temperature of the water is equal to or greater than 80° C.

Generally, chlorine remains in tap water as the tap water is treated by chemicals with chlorine as a main ingredient, and such residual chlorine does harm to a human body like causing atopic dermatitis, so it is necessary to weaken residual chlorine concentration of magnetized water using tap water to or below a predetermined threshold.

According to such embodiment of the present invention, by arranging the plurality of heating plates 130, 140, which are induction conductors, around the induction coil 120 at a predetermined interval from the induction coil 120 installed at the center inside the tube body 110, whose interior is filled with water, and applying high-frequency power to the induction coil 120 causing the induction coil 120 to induce this high-frequency power to the plurality of heating plates 130, 140, the plurality of heating plates 130, 140 are heated, so that the water filling the interior of the tube body 110 is heated and converted into micro-cluster magnetized water, and then the micro-cluster magnetized water is caused to pass through the tube 150, whose middle portion is plurally divided, between the N-pole and the S-pole resulting from the pair of magnets 160, 170. Accordingly, there is an advantage that magnetized water with high electrical conductivity can be generated from general water.

Further, the present invention has an advantage that, in the generation process of magnetized water, there is an advantage that magnetized water with a high magnetization ratio can be generated by causing water, which is subjected to magnetization treatment, to be subjected to magnetization treatment one or more times according to pH, conductivity or residual chlorine concentration.

While the technical spirit on the present invention is described in conjunction with the accompanying drawings as above, it is just to describe preferred embodiment of the present invention as a way of example and it is not limit the present invention. Further, it will be appreciated by the skilled in the art that various changes and equivalents can be made without departing from the spirit of the present invention by those skilled in the art.

The invention claimed is:

1. A device comprising:
   (A) a tube body 110 comprising:
      an induction coil 120 installed at a center inside the tube body 110, and a plurality of heating plates 130, 140, wherein said plurality of heating plates 130, 140 are arranged as induction conductors around the induction coil 120 at a predetermined interval from the induction coil 120;

wherein the interior of the tube body is filled with water to be heated by the plurality of heating plates 130, 140;

(B) a high-frequency generator 180 configured to apply high-frequency power to the induction coil 120 such that the induction coil 120 induces the high-frequency power to the plurality of heating plates 130, 140 to heat the plurality of heating plates 130, 140 and the plurality of heating plates 130, 140 heat the water filling the interior of the tube body 110; and (C) a tube 150 positioned between a pair of magnets 160, 170 wherein a first magnet of said pair of magnets has an N-pole and the second magnet of said pair of magnets has an S-pole, wherein said tube is configured to receive the heated water and cause the heated water to simultaneously pass through the N-pole of the first magnet and the S-pole of the second magnet.

2. The device of claim 1, wherein the tube 150 is a polyethylene injection tube or a polyvinylchloride injection tube.

3. The device of claim 1, wherein the pair of magnets 160, 170 are permanent magnets or electromagnets.

4. The device of claim 1, wherein the high-frequency power is formed by multiplying a frequency of 50 Hz up to 60 Hz by several hundred times.

* * * * *